(12) United States Patent
Cauchon

(10) Patent No.: US 6,494,435 B1
(45) Date of Patent: Dec. 17, 2002

(54) SPRING-LOADED SAFETY WINCH FOR LOAD RESTRAINT SYSTEM

(76) Inventor: Denis G. Cauchon, Delamere Road, Alban On. (CA), P0M 1A0

( * ) Notice: Subject to any disclaimer, the term of this patent is extended or adjusted under 35 U.S.C. 154(b) by 88 days.

(21) Appl. No.: 09/690,718

(22) Filed: Oct. 18, 2000

Related U.S. Application Data

(63) Continuation-in-part of application No. 09/661,081, filed on Sep. 13, 2000, now abandoned, which is a continuation-in-part of application No. 09/532,080, filed on Mar. 21, 2000, now abandoned.

(51) Int. Cl.$^7$ .............. B66D 5/32; B61D 45/00
(52) U.S. Cl. ............ 254/213; 254/364; 254/376; 410/103
(58) Field of Search .............. 254/364, 352, 254/237, 243, 213, 376, 323; 410/100, 103

(56) References Cited

U.S. PATENT DOCUMENTS

| | | | | |
|---|---|---|---|---|
| 2,946,563 A | * | 7/1960 | Eaton | 410/37 |
| 4,036,476 A | * | 7/1977 | Douce | 410/34 |
| RE30,307 E | * | 6/1980 | Arbogast | 410/37 |
| 4,770,578 A | * | 9/1988 | Coleman | 410/34 |
| 5,217,208 A | * | 6/1993 | Stephenson | 254/213 |

* cited by examiner

Primary Examiner—John M. Jillions
(74) Attorney, Agent, or Firm—D. W. Eggins

(57) ABSTRACT

In a load tie-down system that incorporates a wind-down winch for securing and tensioning a hold-down member, the improvement consists of incorporating a tensioning spring that maintains a resilient loading upon the drum of the winch, such that in the event of reduction in the tension of the hold-down member, the drum is driven in a winding-on sense, to maintain tension in the hold-down member. A releasable coupling between the spring and the winch drum enables independent operation of the winch and of the tensioning spring. One embodiment incorporates a spring mounted upon an extension of the winch drum, outside the frame. Helical springs are used. The spring torque is automatically connected to the winch drum, and is automatically disconnected when the spring is de-tensioned. In use, the torque provided by the tensioned spring can be used to boost the tensioning of the hold-down member, by re-applying downward loading torque with the tommy bar, operating on either of the capstans, and then re-tensioning the spring.

13 Claims, 2 Drawing Sheets

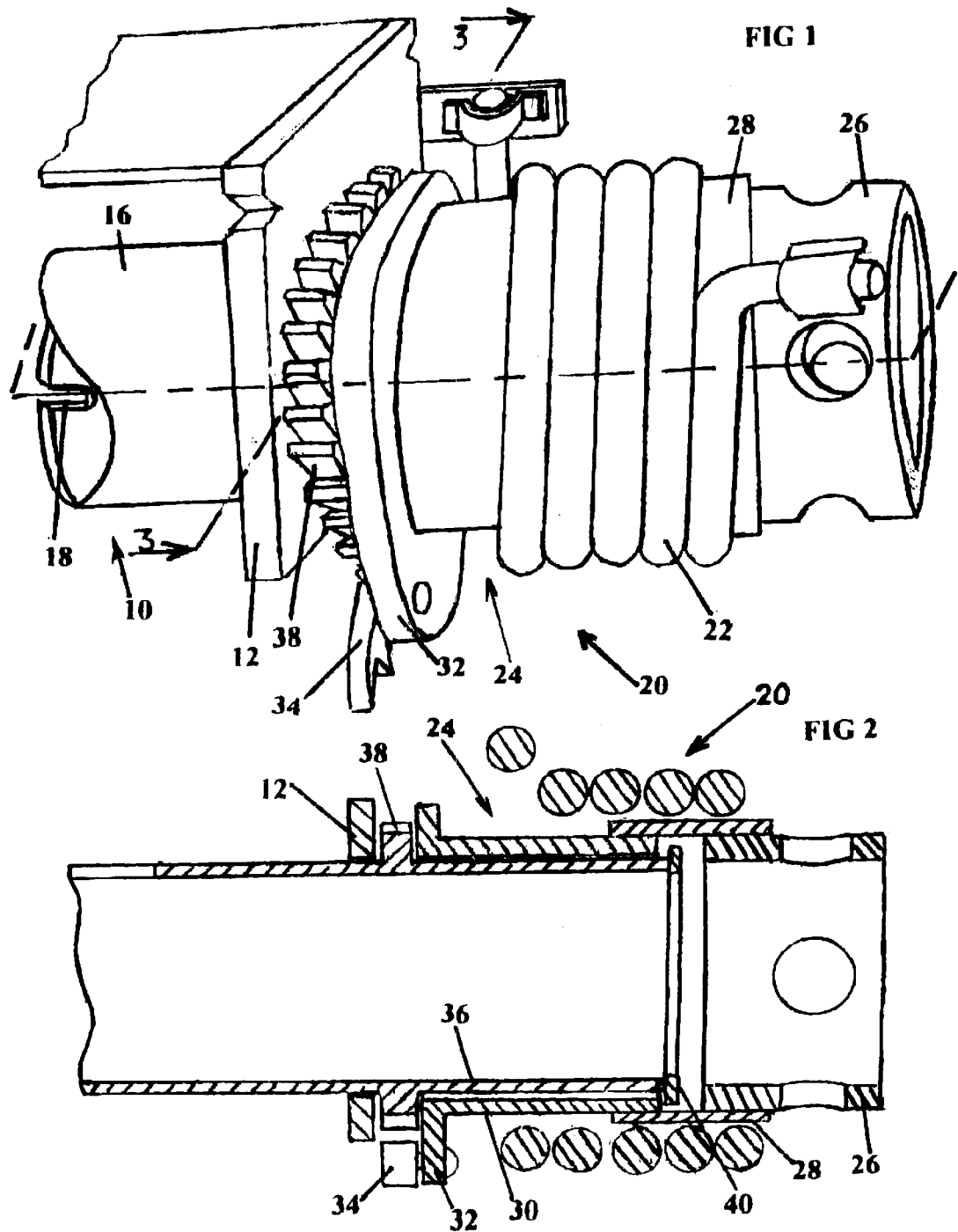

SPRING-LOADED SAFETY WINCH FOR LOAD RESTRAINT SYSTEM

CROSS REFERENCE TO RELATED APPLICATIONS

This application is a Continuation-in-Part of application Ser. No. 09/661,081, filed Sep. 13, 2000, now abandoned. Which-is a Continuation-in-Part of application Ser. No. 09/532,080, filed Mar. 21, 2000, the specifications of which are embodied herein by way of reference.

BACKGROUND OF THE INVENTION

1. Field of the Invention

This invention is directed to a load restraint system, and in particular to a safety adaptation to a load restraint system, for truck load winches, used for securing loads to railcars, flatbeds, automotive trucks and the like, providing a spring loaded safety winch, as OEM spring-loaded winches, and the conversion of existing winches.

2. Description of the Prior Art

The attachment of loads upon the beds of vehicles, for safe transportation, usually relies upon hold-down members, such as straps, chains, cables and the like that are passed over the load and secured to the sides of the vehicle, and there tensioned.

Tensioning of the hold-down members is usually effected by use of an in-situ, hand-operated winch to which one end of the hold-down member is attached.

The winch has a drum, about which an end of the hold-down member is wound. The drum has a capstan which is rotated by means of a lever or Tommy-bar that is inserted into a selected hole in the drum capstan, and the bar is then cranked angularly, to wind the hold-down member onto the drum, and to tension it.

The winch drum has a toothed ratchet portion at one end, adjacent the capstan, against which a ratchet pawl engages, to prevent reversed, overhauling rotation of the drum, which would otherwise result in the loss of the tension that is applied to the hold-down member. The use of nylon or other straps of suitable plastic may provide a degree of elasticity to the load restraint system. However, despite such elasticity, there is a distressingly frequent loss of tension in the hold-down member, due to settling of the load. This frequently results in shifting of the load, often with disastrous, frequently fatal consequences, more particularly for other road users. In cases where cables or chains are used as the hold-down member, the maintenance of tension is an even greater problem, due to an absence of elasticity and resilience in the hold-down member. Any settling of the load can lead to instantaneous loss of hold-down tension, which can then lead rapidly to shifting of the load. This particularly applies to loads such as logs.

This problem of inadequate security of load attachment is currently leading towards legislation proposing that, in the case of road trucks, for every three hours of travel or 150 miles covered, the vehicle shall be halted and the tension of the load securing hold-down members be checked. As there are usually a significant number of load members and their associated winches along the length of a modern, extended transport truck and/or trailer, such further checking involves the expenditure of considerable further time and effort on the part of the driver.

Added to this is the roadside hazard, affecting both passing traffic, in the event that there is no proper pull-off for the trucker to use, and more particularly involving the truck driver, who is particularly vulnerable beside the truck, when preoccupied in pulling down with full force against each of many winches, to re-tension the respective hold-down members.

A particularly adverse factor is the repetition, winch after winch, and time after time of the gross physical strain imposed upon the driver, particularly to the shoulders and back, the latter being especially vulnerable to injury. Instances of severe frontal injury and even death have occurred, usually due to kick-back or dislocation and forcible discharge of the loading bar from the winch.

SUMMARY OF THE INVENTION

The present invention has a preferred embodiment, applicable to OEM equipment and also having retro-fit capability, as an improvement to prior-existing load restraint winch systems, as used for securing an elongated load hold-down member in secured, tensioned relation across a load. The prior winch systems generally comprise a winch having a drum rotatable mounted in a frame; the frame having mounting notches, for sliding attachment of the winch to a winch track on the side of a truck; a manually operated capstan that receives an inserted loading (tommy) bar with which the capstan is rotated, to rotate the drum so as to wind-on and apply load-securing tension to the hold-down member; and a first ratchet-and-pawl means to prevent over-hauling reversal of the drum by the tensioned hold-down member. The drum portion of the winch to which the hold-down strap or cable is attached may comprise three parallel straight bars, spaced from, and parallel with the axis of rotation of the assembly. The load strap or cable is threaded between these bars, and wound about the bar assembly, which serves as the winch drum.

The preferred embodiment consists of spring-loaded tensioning means, mounted for rotation independently of the winch drum, and connected to the winch drum in driving relation by way of a second ratchet arrangement. The tensioning spring is loaded by means of a manual capstan, using the loading or tommy bar in the usual fashion. However, in the preferred embodiment, the tommy bar is pulled upwardly in order to load the spring, whereas the loading strap is normally first pulled down and tightened by the winch capstan, by cranking the tommy bar downwardly. In the unloaded condition of the spring, the pawl of the spring ratchet hangs clear of the ratchet, in a disengaged condition, leaving the drum of the winch free for normal use in the unwinding or winding-on of the load strap. The winch is thus used in its normal fashion, to apply and tension the load strap.

Then, upon upward loading of the spring by way of the spring capstan and inserted tommy bar, the pawl, being displaced arcuately upward with upward motion of the tommy bar, swings inward to engage the ratchet as the pawl moves upwardly. The spring assembly can be rotatably mounted upon an extension of the winch drum, lying outside of the winch frame, in the case of a short-frame winch; or within the frame of a long-frame winch, in coaxial relation with the winch drum.

Conversion of an existing winch to a spring-maintained safety model can be carried out by welding an extension cylinder to the winch drum. This extension cylinder carries a peripheral ratchet, to transfer torsional load from the spring to the winch drum.

The loading spring, in the form of a helical coil spring is mounted upon its cylinder, which can then be mounted in rotatable relation upon the extension cylinder of the winch drum. The spring cylinder carries the ratchet pawl that can engage the extension cylinder ratchet, when the spring is tensioned, to transfer torque loading to the winch drum. The rotatable spring-loaded tensioning means is secured to the winch drum in coaxial relation, and pre-tensioned to drive the winch drum in tension-maintaining relation with the hold-down member, in the event that the tension in the hold-down member should diminish.

The subject multi-coil spring is of predetermined stiffness, to provide a pre-determined winding take-up capacity to the load hold-down member, to absorb any slackening that may occur due to normal load settlement.

The subject spring-loaded tensioning means may include low-friction support bearings for the rotational parts.

The inner end of the spring is secured against rotation by way of a bracket mounted on the adjoining end face of the winch frame.

The axially outer end of the spring is secured to the spring capstan by way of an axially extending tang portion of the spring.

In use, this embodiment has the particular advantage that an operator/trucker can retain both hands upon the lever when loading the spring, as the pawl of the spring system engages the associated ratchet automatically under the effects of gravity as the pawl is displaced upwardly due to raising of the tommy bar.

The present invention thus provides a method of tensioning a load restraining hold-down device having a flexible hold-down member wound in tensioned relation upon a rotatable drum, including the steps of tensioning a driving spring, and connecting it in loading relation with the drum, and restraining the spring against reverse over-run, whereby, upon reduction in the tension of the hold-down member due to a change in load conditions, the drum is driven by the driving spring in a direction to maintain tension in the hold-down member, to restrain the load.

BRIEF DESCRIPTION OF THE DRAWINGS

Certain embodiments of the invention are described by way of illustration, without limitation thereto other than as set forth in the accompanying claims, reference being made to the accompanying drawings, wherein:

FIG. 1 is a perspective side view of a portion of a load restraint winch having a torsion loading spring system in accordance with the present invention mounted thereon;

FIG. 2 is a diametrical section plan view of the FIG. 1 arrangement, taken at the median line;

DETAILED DESCRIPTION OF THE INVENTION

Figure 3:
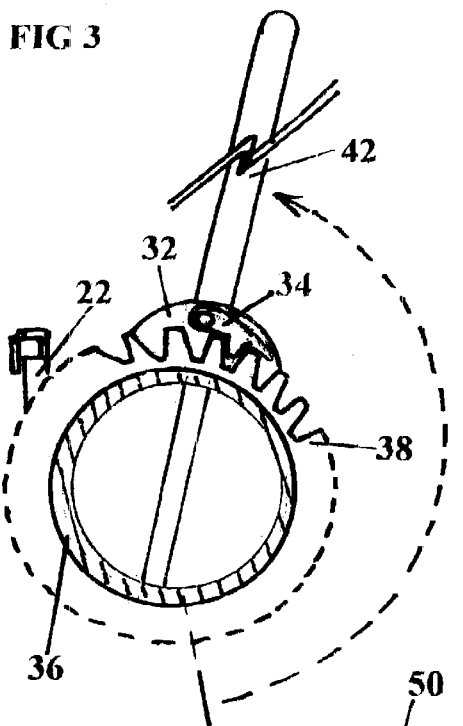
FIG. 3 is a section view, taken at 3—3 of FIG. 1, showing the spring-loading movement of a tommy bar, and engagement of the spring pawl with the spring ratchet; and, FIG. 4 is a side elevation of a long frame embodiment.

Referring to FIG. 1, this arrangement shows an end portion 10 of a truck winch, previously terminating at the right hand end frame portion 12. The view shows a portion of the winch drum 16 rotatably mounted in end frame portion 12, and manually driven by a capstan (not shown), by means of a lever or tommy-bar (referred to below).

The drum 16 has a slot 18 (of which a small portion is shown) through which the hold-down member (not shown) is threaded. This load retention hold down member is frequently a nylon strap, which is tensioned about the drum 16 by downward motion of the tommy bar. A toothed ratchet wheel and associated pivotal pawl (not shown) serve to prevent overhauling of the winch drum 16 by the tensioned load strap.

In this first embodiment of the present invention the spring-loaded tensioning means 20, (see also FIG. 2) has a helical spring 22 loosely mounted upon a cylindrical assembly 24. The assembly 24 includes a capstan 26, a bridging cylinder 28, a spring cylinder portion 30, and a pawl cam plate 32, to which a pawl 34 is pivotally mounted.

An extension cylinder 36 that is welded to the drum 16 of the winch 10 has a toothed ratchet wheel 38 integrally secured thereto. A radially projecting annular lip 40 completes the extension cylinder 36. The lip 40 serves to retain the tensioning means 20 upon the extension cylinder 36. The tensioning means 20, including assembly 24 is rotatably mounted on the extension cylinder 36, enabling it to be rotated independently of the winch drum, and also enabling the freeing of the winch drum 16 for its necessary rotations in letting out the load member (strap) and in taking up the slack of the strap and tensioning it to a desired extent, by downward leverage on the loading tommy bar, against the winch capstan (not shown).

Referring to FIG. 3, with the winch drum 16 in a loaded condition, when a tommy bar 42 is inserted upwardly into engagement with the capstan 26 of the tensioning means 20 it can be seen how, with upward displacement of the tommy bar 42, which serves to tension the spring 22, the pawl cam plate 32 is rotated, moving the pawl 34 from the position shown in FIG. 1 to the upper location as illustrated in FIG. 3. The raised pawl 34 turns upon its pivot, under the influence of gravity, to engage the ratchet wheel 38 of the extension cylinder 36, thus locking the tensioned spring 22 in torque transfer connection with the winch drum 16. Thus it will be seen that in the unloaded condition of the spring 22, the pawl 34 of the spring ratchet hangs clear of the ratchet wheel 38, in a disengaged condition, leaving the drum 16 of the winch free for normal use in the unwinding or winding-on of the load strap. The winch is thus used in its normal fashion, to apply and tension the load strap.

Then, upon upward loading of the spring 22 by way of the spring capstan 26 and the inserted tommy bar 42, the pawl 34, being displaced arcuately upward with upward motion of the tommy bar 42, swings inward to engage and ratchet over the ratchet wheel 38 as the pawl 34 is displaced upwardly.

Figure 4:
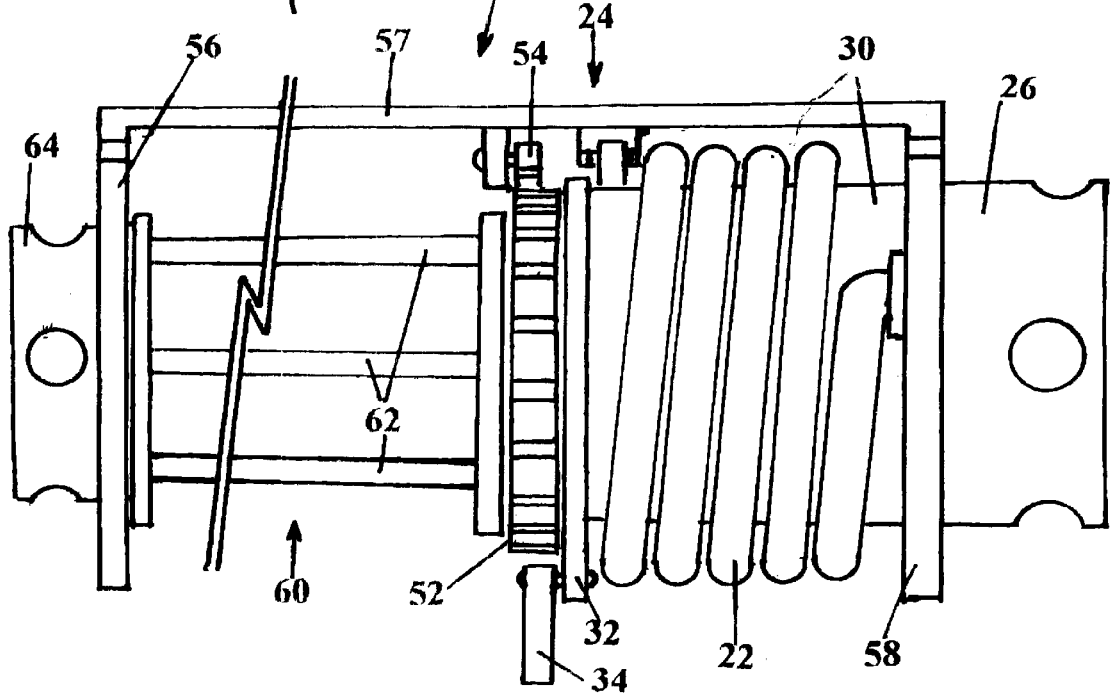

Turning to the FIG. 4 long-frame embodiment 50, this arrangement is illustrated as having a single central ratchet wheel 52, with a main winch pawl 54 suspended by a bracket from the frame member 57, and a spring pawl 34 mounted upon a pawl cam plate 32, in the same fashion as that of FIGS. 1,2 and 3. All of the elements of the spring loaded tensioning means 20 are contained within the frame ends 56, 58 except the capstan 26, which extends through the frame end 58.

The winch drum 60 is illustrated as having three bars 62, referred to above, about which the load strap (not shown) is wound, and a load capstan 64.

The adoption of the long frame embodiment enables the bridging cylinder 28 and the annular lip 40 to be dispensed with, wherein the frame end members 56, 58 serve to contain the elements from axial separation, such that the capstan 26 connects directly with the spring cylinder 30, which is correspondingly elongated.

In use, with the spring 22 untensioned, and the pawl cam plate 32 and pawl 34 in the lowermost, disengaged position, shown in FIG. 1, the winch is free to be operated in usual fashion.

Thus, the winch pawl 54 can be disengaged by being reversed, freeing the winch drum 60 for the unwinding of the load strap, and the positioning of the load strap across the load. The winch pawl 54 is then engaged, the slack in the load strap taken up onto the winch drum 60, and the load strap tightened by application of the tommy bar 42 in downward torquing relation with the winch capstan 64.

The tommy bar 42 is then applied to the spring capstan 26 and torqued upwardly, causing the spring 22 to be tensioned, while also bringing the spring pawl 34 into engagement with the ratchet wheel 52, thus applying the torque from the spring to the winch drum 60. At this stage in the operation of both of the illustrated embodiments, the tommy bar can be used in applying more load to the winch drum and strap, by torquing downwardly with the tommy bar 42 on either of the capstans 26, 64. This action utilizes the torque of the spring 22 to reinforce the torque applied by the tommy bar 42.

By using the capstan 26, the up-and-down torquing motion of the tommy bar 42 can repeatedly re-torsion the spring 22 and then utilize that torque in further loading the winch drum. It will be clearly understood that two separate ratchet wheels can be utilized with a long frame embodiment, in place of the single central ratchet wheel 52 as shown in FIG. 4. With the spring 22 tensioned and its torque applied to the winch drum, as explained above, in the event that the load now settles, such as to normally cause slackening of the hold-down strap, the torque applied by the spring 22 will cause the winch drum 16 to maintain tension in the load strap, so that no slack occurs, and the settlement is compensated for. In a typical installation the spring has caused the taking up of as much as several inches of the hold-down strap, while maintaining a working tension in the hold down strap. However, it will be understood that the tension applied to the hold-down member becomes correspondingly diminished as take-up under action of the spring occurs. De-tensioning of the spring 22 is readily effected, by insertion of the tommy bar 42 into the capstan 26, taking up the torque by upward motion of the bar 42, to release the pawl 34, which can then be retracted from the ratchet wheel 52, and the bar 42 moved downwardly to de-tension the spring 22, and return the spring pawl 34 to its inoperative, lowermost position. It will be understood that the dual purpose winch/spring ratchet wheel 52, shown in FIG. 4 can be applied to the FIG. 1 embodiment, with the winch pawl supported from the winch end frame 12 by way of a bracket extending outwardly therefrom, from which the winch pawl is pivoted. Location of the winch pawl so as to make contact on the rearward portion of the ratchet wheel 52 may enable the use of a standard, single width ratchet wheel, as the spring ratchet 34 does not normally pass the centre-line (top) of the ratchet wheel.

What is claimed is:

1. A load restraint system for securing an elongated load hold-down member in secured, tensioned relation, including a winch having a rotatable drum; first capstan means for rotating the drum in a first loading direction to wind-on and apply load-securing tension to the hold-down member; first ratchet means to prevent over-hauling of the drum by the tensioned hold-down member, and spring-loaded tensioning means connectable to the drum in tensioned relation, to drive the drum in tensioning relation with the hold-down member, said spring-loaded tensioning means including spring means; second capstan means for rotating said spring means in a second direction opposed to said first direction, in tensioning relation with said spring; and second ratchet means connecting said spring with said rotatable drum in load transfer relation therewith, whereby in use, upon diminishment of tile load-securing tension in the hold-down member, the spring-loaded tensioning means operates to rotate the winch drum, to thereby sustain tension in the hold-down member.

2. The load restraint system as set forth in claim 1, said second ratchet means being pivotally mounted to automatically connect said spring means to said winch drum in torque transfer relation therewith upon the substantial loading of said spring means.

3. The load restraint system as set forth in claim 2, said spring-loaded tensioning means including a torsion spring having said second capstan means connected thereto for selectively applying torque to said torsion spring.

4. The load restraint system as set forth in claim 3, said second ratchet means including a disengageable ratchet pawl removably insertable in driving, torque transfer relation between said spring means and said winch drum.

5. The load restraint system as set forth in claim 1, said spring-loaded tensioning means having a multi-coil spring of predetermined stiffness, capstan means connected in spring-loading rotational relation with the spring, to enable the application of torsional energy thereto; ratchet means to prevent over-hauling of the spring and connecting the tensioning means in torque applying load transfer relation with the winch drum.

6. The load restraint system as set forth in claim 1, wherein said drum has an extension cylinder having a spring mounted thereon; said second capstan means being directly connected in rotational relation with said extension cylinder, to tension the spring; and impart torsional energy thereto; said second ratchet means connecting said extension cylinder in torque applying load transfer relation with the winch drum.

7. The load restraint system of claim 6, wherein said spring and said drum extension are located within the confines of a supporting frame portion of said winch.

8. The load restraint system of claim 1, said first ratchet means including a dual-purpose ratchet wheel having a winch-controlling first pawl; said second ratchet means having a second pawl connectable with the ratchet wheel, said first pawl saving to restrain torsion loading applied directly to said winch, and said second pawl saving to connect said torsion loading of said spring means to said winch by way of said ratchet wheel.

9. The load restraint system of claim 2, wherein said second ratchet means includes a toothed wheel secured in driving relation with said winch drum, and a spring ratchet pawl pivotally secured to said spring-loaded tensioning means, including ratchet pawl support means movable synchronously with said spring-loaded tensioning means on upward displacement of said ratchet pawl support means, to bring said spring ratchet pawl into contact with said ratchet wheel upon the application of effective torque loading to said spring-loaded tensioning means, to connect said spring-loaded tensioning means to said drum, to transfer said effective spring torque loading to said winch drum.

10. The method of tensioning a load restraining hold-down device having a flexible hold-down member manually wound in a first direction in tensioned relation upon a rotatable drum, being retained against over-ran by a first ratchet means; including the steps of providing a tensioning driving spring in automatic loading relation with said drum, having second ratchet means restraining said spring against reverse over-run; tensioning said driving spring by applying force thereto in a second direction opposed to said first direction; applying said second ratchet means in restraining relation therewith to connect said driving spring with said drum, whereby, upon reduction in the tension of said hold-down member due to a change in load conditions, said drum is driven by said driving spring in said first direction to maintain tension in said hold-down member in load restraining relation.

11. The method as set forth in claim 10, wherein said second ratchet means is operated as displace able coupling means to selectively disconnect said driving spring from said drum, to permit operation of said drum and said hold-down member independently of said driving spring, to wind/unwind said hold-down member relative to said drum.

12. The method as set forth in claim 10, including the steps of further tensioning said flexible hold-down member by applying force to said drum in said fist direction assisted by said tensioned driving spring, re-tensioning said driving spring by applying force thereto in said second direction, and reconnecting said driving spring in torque transfer relation with said drum.

13. The method as set forth in claim 11, said first ratchet means including a dual purpose ratchet wheel connecting said winch drum with a first, stationary load pawl, thereby preventing overhauling of said winch drum, said second ratchet means including a second load pawl connected to and displace able with said driving spring; and connecting said second pawl with said winch drum by way of said dual purpose ratchet wheel when said driving spring is substantially tensioned.

* * * * *